UNITED STATES PATENT OFFICE.

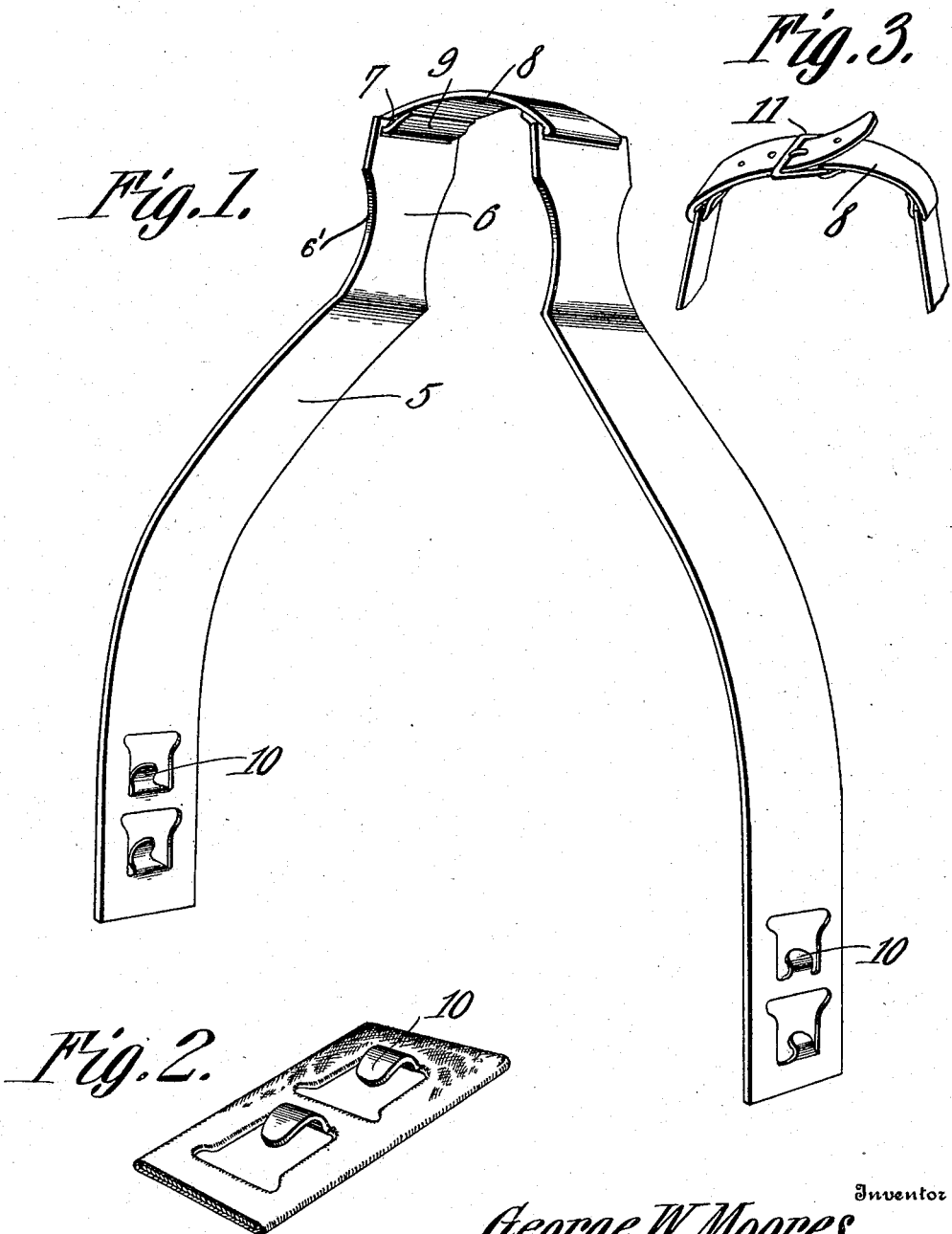

GEORGE W. MOORES, OF NEW ORLEANS, LOUISIANA.

ADJUSTABLE IRON BACK-BAND AND HOOK.

937,257.

Specification of Letters Patent. Patented Oct. 19, 1909.

Application filed November 6, 1908. Serial No. 461,379.

*To all whom it may concern:*

Be it known that I, GEORGE W. MOORES, a citizen of the United States, residing at New Orleans, in the parish of Orleans and State of Louisiana, have invented a new and useful Adjustable Iron Back-Band and Hook, of which the following is a specification.

The primary object of the present invention is to provide a back-band for harness which, while it is comprised, in part, of a pair of rigid members, preferably of sheet-metal, will not inconvenience the draft animal and will yield to movement of the body of the animal.

As stated above, the back-band preferably consists of a pair of sheet-metal members and in order to obtain the results mentioned above, I connect the two members at their upper ends by a flexible means which permits relative movement of the members in a plurality of planes.

It is a further object of the invention to provide, in a back-band, trace hooks which are so arranged as to prevent accidental disengagement of the traces therefrom.

In the accompanying drawings, Figure 1 is a perspective view of a back-band constructed in accordance with my invention, and Fig. 2 is a view of the lower portion of the band showing also a protective covering which may be applied thereto. Fig. 3 is a detail perspective view of a slightly modified form of the invention.

As heretofore stated, and as shown in the drawings, my invention is comprised in part of a pair of members which are indicated in general by the numeral 5. The major portion of each member 5 is bowed substantially in the arc of a circle to fit the side of the draft animal and, at their upper ends, the members are each bent to extend at an angle to their major portion as indicated by the numeral 6 to fit to each side of the back-bone of the animal.

Each member 5 is formed at the upper end of its portion 6 with a slot 7 which forms in effect a loop at the upper end of the said portion, and through each slot 7 is inserted one end of a strap 8, the ends of the strap being stitched to the body thereof after being inserted through the slots as clearly shown at 9 in Fig. 1 of the drawings. The slots 7 are preferably of a width nearly equal to the width of their respective members 5 and the strap 8 is also of such width, so that practically a continuous band is provided from one end of the back band to the other.

From the description of the invention thus far given, it will be understood that I have provided a flexible connecting means for the two members of the back-band which is of soft material and will not therefore injure the ridge of the back-bone of the animal. It will further be understood that this flexible connection is of such nature that the members 5 may be moved laterally away from each other or toward each other and in a direction at right angles to the line of such movement, independently of each other so that the freedom of movement of the animal is not impaired.

At and adjacent its lower end, each of the members 5 is formed with one or more trace hooks 10, these hooks being struck up directly from the material of their respective members and being bowed outwardly for the engagement of the trace therewith but having their extremities in a plane with the lower portions of their respective members 5. By so positioning the hooks with respect to their body portions, engagement of the traces with the hooks is in no way hindered but accidental disengagement of the traces from the hooks is effectually prevented inasmuch as the traces must pass over the extremities of the hooks and cannot do so unless manually disengaged.

It is sometimes desirable to cover the members 5 of the back-band with a canvas sheath it being understood of course that other material may be used if found expedient.

In the form of the invention shown in Fig. 3 of the drawings a buckle 11 is interposed in the strap 8, the strap being formed of two lengths which are adjustably connected in this manner.

From an inspection of Fig. 1 of the drawings, it will be observed that the edges of the vertical portions 6 of the back band members are cut away as indicated by the numeral 6' and that owing to this construction, the members may have relative torsional movement without the said edges biting into the back of the animal.

What is claimed is:—

A back band comprising a pair of flat rigid members, each member being bent abruptly adjacent its upper end to afford portions projecting substantially vertically and in parallelism and portions curved downwardly and outwardly from each other, and extending at their lower ends substantially parallel, each of the members having the edges of its substantially vertical portion cut away, each member being formed at its upper end with a loop, a flexible strap secured at its ends to the loops and connecting the two members, whereby to admit of movement thereof, one with respect to the other, each of the members adjacent its lower end being stamped to afford upwardly directed trace hooks, and a covering sheet fitted upon each member and entirely covering the surface of the same, said sheet being provided with slits through which the trace hooks project.

In testimony that I claim the foregoing as my own, I have hereto affixed my signature in the presence of two witnesses.

GEORGE W. MOORES.

Witnesses:
A. S. HEWS,
ANDREW HEWS.